(12) United States Patent
Nitta

(10) Patent No.: US 8,824,002 B1
(45) Date of Patent: Sep. 2, 2014

(54) IMAGE FORMING APPARATUS PERFORMING IMAGE ROTATION

(71) Applicant: Kyocera Document Solutions Inc., Osaka (JP)

(72) Inventor: Tsuyoshi Nitta, Osaka (JP)

(73) Assignee: Kyocera Document Solutions Inc., Osaka (JP)

( * ) Notice: Subject to any disclaimer, the term of this patent is extended or adjusted under 35 U.S.C. 154(b) by 0 days.

(21) Appl. No.: 14/199,172

(22) Filed: Mar. 6, 2014

(30) Foreign Application Priority Data

Mar. 7, 2013 (JP) ................................. 2013-045555

(51) Int. Cl.
  *G06K 15/00* (2006.01)
  *G06F 3/12* (2006.01)
  *H04N 1/00* (2006.01)

(52) U.S. Cl.
  CPC ....... *H04N 1/00779* (2013.01); *H04N 1/00721* (2013.01)
  USPC ............................................ 358/1.2; 358/1.1

(58) Field of Classification Search
  None
  See application file for complete search history.

(56) References Cited

U.S. PATENT DOCUMENTS

| | | | |
|---|---|---|---|
| 6,157,747 A * | 12/2000 | Szeliski et al. | 382/284 |
| 6,268,927 B1 | 7/2001 | Lo et al. | 358/1.15 |
| 6,360,028 B1 | 3/2002 | Kaji et al. | 382/296 |
| 6,512,899 B2 * | 1/2003 | Shimada et al. | 399/82 |
| 2002/0018677 A1 * | 2/2002 | Sato et al. | 399/365 |
| 2014/0133938 A1 * | 5/2014 | Tachibana | 412/6 |

FOREIGN PATENT DOCUMENTS

| | | |
|---|---|---|
| JP | 10-181137 A | 7/1998 |
| JP | 2000-198245 A | 7/2000 |

* cited by examiner

*Primary Examiner* — Marcus T Riley
(74) *Attorney, Agent, or Firm* — Stein IP, LLC

(57) ABSTRACT

An image forming apparatus includes an image rotation processor and an image combination unit. The image rotation processor is configured to: rotate the form image such that the direction of the upper edge of the document image on the first page matches a direction of an upper edge of a form image if the direction of the upper edge of the document image on the first page differs from the direction of the upper edge of the form image based on the form image data; and rotate a document image on each page of the second page and the subsequent pages such that the direction of the upper edge of the document image on the first page matches a direction of an upper edges of the document image on each page of the second page and the subsequent pages in a similar case.

12 Claims, 5 Drawing Sheets

IMAGE FORMING APPARATUS PERFORMING IMAGE ROTATION

CROSS-REFERENCE TO RELATED APPLICATION

This application is based upon, and claims the benefit of priority from, corresponding Japanese Patent Application No. 2013-045555, filed in the Japan Patent Office on Mar. 7, 2013, the entire contents of which are incorporated herein by reference.

BACKGROUND

Unless otherwise indicated herein, the description in this section is not prior art to the claims in this application and is not admitted to be prior art by inclusion in this section.

A certain image forming apparatus can combine a form image with a document image and output an image after combination.

Furthermore, there is provided an image forming apparatus that rotates the form image such that directions of a page image and the form image match every page of the document image.

SUMMARY

An image forming apparatus includes an image rotation processor and an image combination unit. The image rotation processor is configured to: obtain form image data; identify a direction of an upper edge of a document image on a first page; rotate the form image such that the direction of the upper edge of the document image on the first page matches a direction of an upper edge of a form image if the direction of the upper edge of the document image on the first page differs from the direction of the upper edge of the form image based on the form image data; rotate a document image on each page of the second page and the subsequent pages such that the direction of the upper edge of the document image on the first page matches a direction of an upper edges of the document image on each page of the second page and the subsequent pages if the direction of the upper edge of document image on each page of the second page and the subsequent pages differs from the direction of the upper edge of the document image on the first page. The image combination unit is configured to combine the form image processed by the image rotation processor with the document image on each page.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

DETAILED DESCRIPTION

Figure 1:
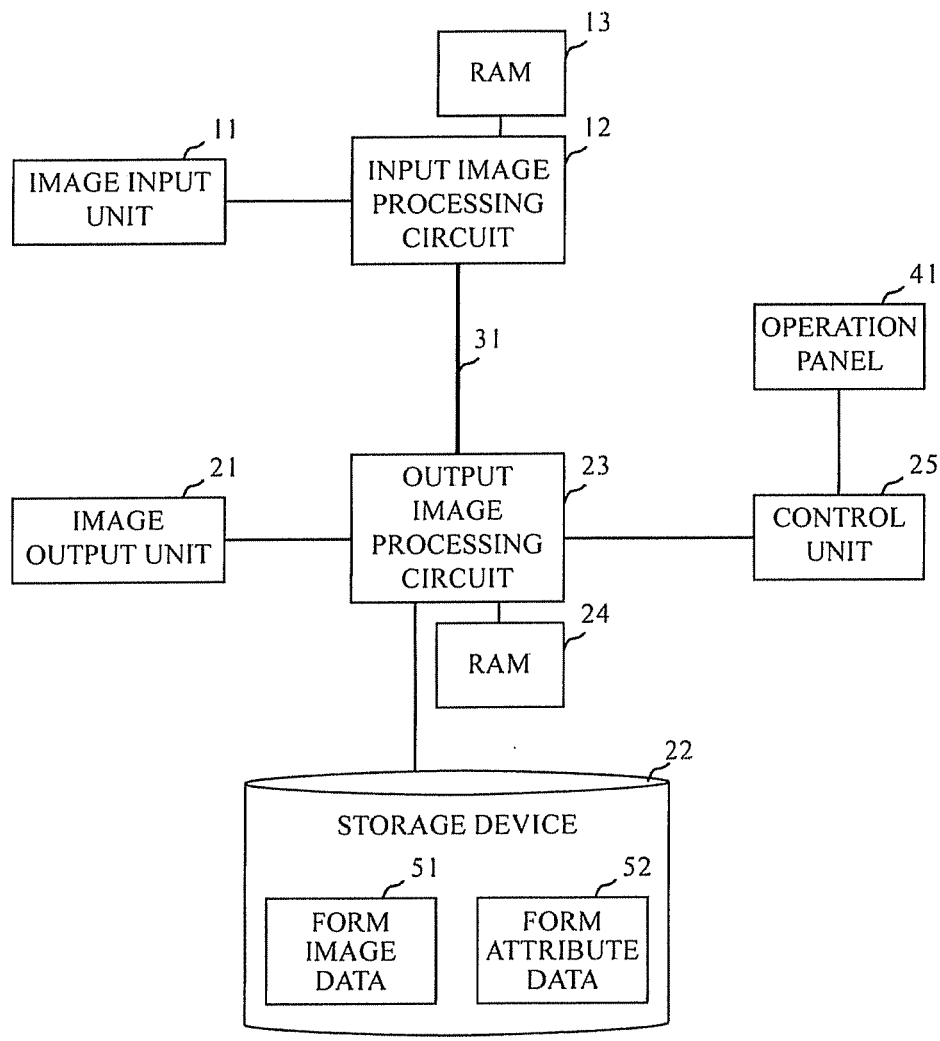
FIG. 1 illustrates a configuration of an image forming apparatus according to an embodiment of the disclosure.

Example apparatuses are described herein. Other example embodiments or features may further be utilized, and other changes may be made, without departing from the spirit or scope of the subject matter presented herein. In the following detailed description, reference is made to the accompanying drawings that form a part thereof.

The example embodiments described herein are not meant to be limiting. It will be readily understood that the aspects of the present disclosure, as generally described herein, and illustrated in the drawings, can be arranged, substituted, combined, separated, and designed in a wide variety of different configurations, all of which are explicitly contemplated herein.

The following describes embodiments of the disclosure based on the drawings.

FIG. 1 illustrates a configuration of an image forming apparatus according to an embodiment of the disclosure. The image forming apparatus illustrated in FIG. 1 includes an image input unit 11, an input image processing circuit 12, and a RAM 13 in an image input side system. The image forming apparatus includes an image output unit 21, a storage device 22, an output image processing circuit 23, a RAM 24, and a control unit 25 in an image output side system. The image input side system and the image output side system are, for example, configured on separate circuit boards and are connected with an interface 31.

In FIG. 1, the image input unit 11 is an internal device. The image input unit 11, for example, sequentially feeds a document of a plurality of pages with an auto document feeder (ADF), optically reads the document images page by page, and generates image data of the document image of each page.

The input image processing circuit 12 performs an input side image process on the document image by image reading. The input side image process includes a resolution conversion, a conversion of image data format, a color conversion, and similar process. The input image processing circuit 12 includes an Application Specific Integrated Circuit (ASIC) or similar circuit.

The Random Access Memory (RAM) 13 is an image input side memory where an input side buffer region is secured by the input image processing circuit 12. The RAM 13 is directly connected to the input image processing circuit 12. The input image processing circuit 12 reads/writes data from/to the RAM 13 with a built-in memory controller. For example, the input image processing circuit 12 secures the input side buffer region in the RAM 13. The input side buffer region buffers image data of the document image at the start of a copy job.

The image output unit 21 is an internal device that prints an image on a printing paper sheet page by page based on image data from the output image processing circuit 23 by an electrophotographic system. For example, the image output unit 21 outputs an image obtained by combining a frame image with the document image.

The storage device 22 is a large-scale nonvolatile data storage device that stores image data after the output side image process by the output image processing circuit 23 on an image output side or similar data. The storage device 22 includes a hard disk drive, a Solid State Drive (SSD), or similar drive.

The output image processing circuit 23 performs an output side image process for printing. The output side image process includes resolution conversion, enlargement/reduction of image, rotation of image, and similar process. For example, the output image processing circuit 23 includes an ASIC or similar circuit. The output image processing circuit 23 (a) secures an output side buffer region in the RAM 24 at a start of a copy job. (b) Upon reception of the image data from the input image processing circuit 12 via the interface 31, the output image processing circuit 23 stores the image data in the output side buffer region in the RAM 24. (c) The output image processing circuit 23 performs the output side image process on the image data stored in the output side buffer region using the output side buffer region and outputs the image data after the output side image process to the image output unit 21 and/or the storage device 22.

The RAM 24 is an image output side memory whose output side buffer region is secured by the output image processing circuit 23. The RAM 24 is directly connected to the output image processing circuit 23. The output image processing circuit 23 reads/writes data from/to the RAM 24 using the built-in memory controller.

Since the RAM 13 is on the image input side, the RAM 13 is used only for an image data process from the image input unit 11. However, as well as a process of the image data from the image input side, the RAM 24 is also used for various processes including a process in response to a request from the control unit 25 or similar process.

The control unit 25 is a computer including a Cent al Processing Unit (CPU), a Read Only Memory (ROM), a RAM, or similar component. The control unit 25 accepts a job such as a copy job and causes the output image processing circuit 23 or similar circuit to perform an operation corresponding to the job.

The control unit 25 displays various information and operation screens on a display device of an operation panel 41. The control unit 25 also detects a user setting, a user operation, or similar operation accepted by an input device of the operation panel 41 and causes the output image processing circuit 23 or similar circuit to perform processes based on these operations.

The interface 31 connects the input image processing circuit 12 and the output image processing circuit 23. As the interface 31, for example, a Peripheral Components Interconnect express (PCIe) is employed.

The operation panel 41 is located on a front surface side of a housing of the image forming apparatus according to the embodiment. The operation panel 41 includes a display device that displays various types of information for user such as a liquid crystal display, and an input device that accepts a user operation such as a touch panel.

The operation panel 41 accepts a user setting on a direction of the upper edge of the document image (that is, a side in the upper (top) direction of characters, photographs, or similar image in the document image). That is, the operation panel 41 accepts a user operation specifying a setting direction of the document.

FIGS. 2A and 2B and FIGS. 3A and 3B illustrate the direction of the upper edge of the document image.

Figure 2A:
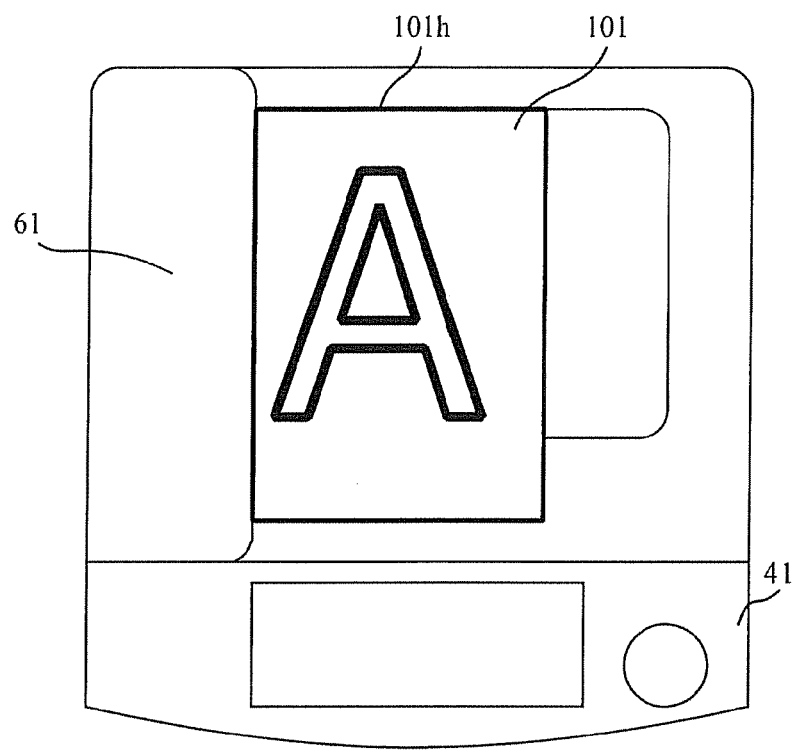
FIGS. 2A and 2B illustrate a direction of the upper edge of a document image (diagrams of the situation in which the direction of the upper edge of the document image is oriented "depth-ward")
Figure 2B:
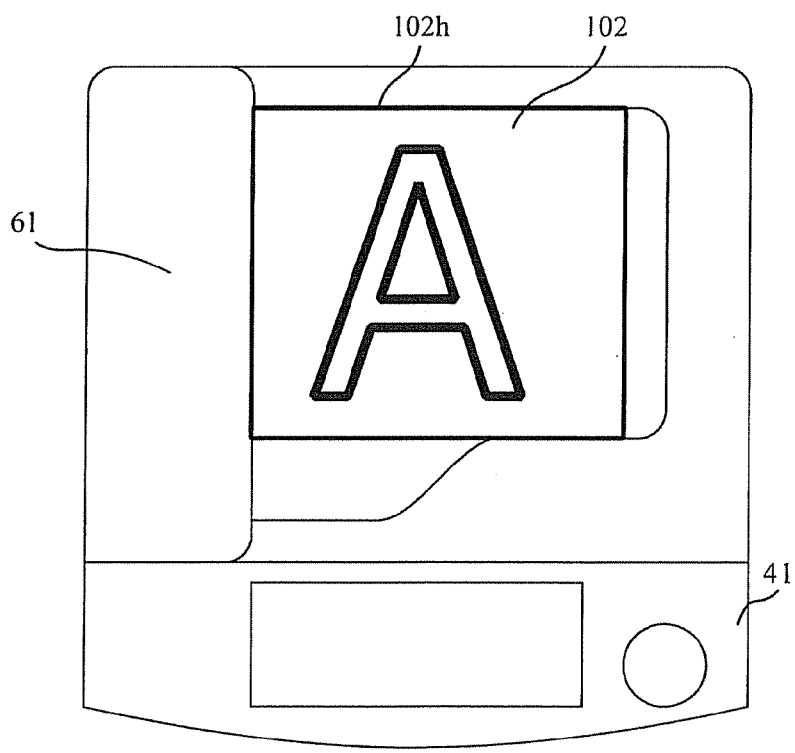

For example, to set an upper edge 101h of a portrait-oriented document 101 as illustrated in FIG. 2A, or an upper edge 102h of a landscape-oriented document 102 as illustrated in FIG. 2B oriented depth-ward along the apparatus at an ADF 61, the user operates the operation panel 41 to set the document setting direction as "depth-ward."

Figure 3A:
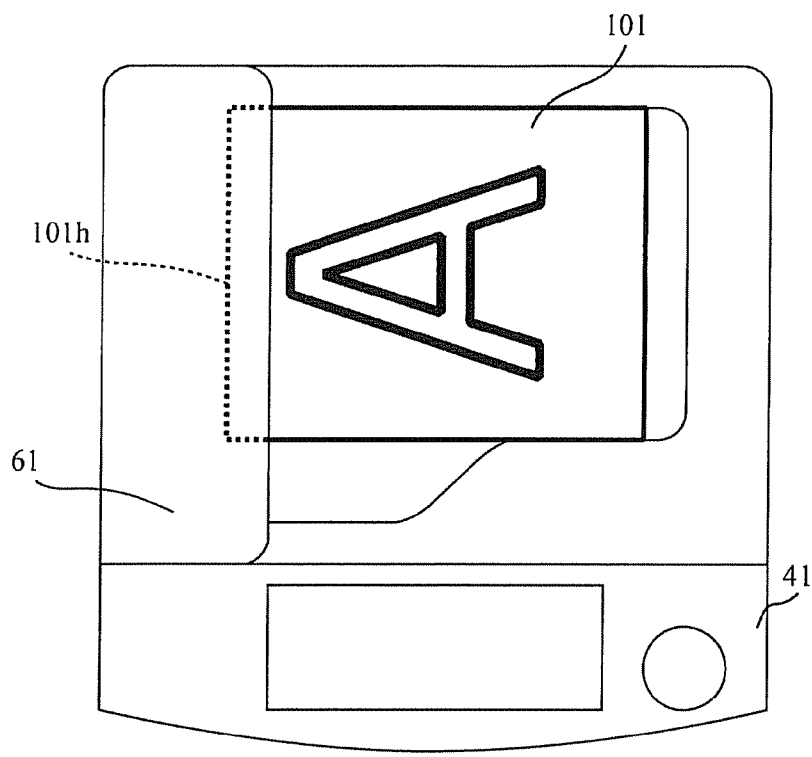
FIGS. 3A and 3B illustrate the direction of the upper edge of the document image (diagrams of the situation in which the direction of the upper edge of the document image is oriented "left")
Figure 3B:
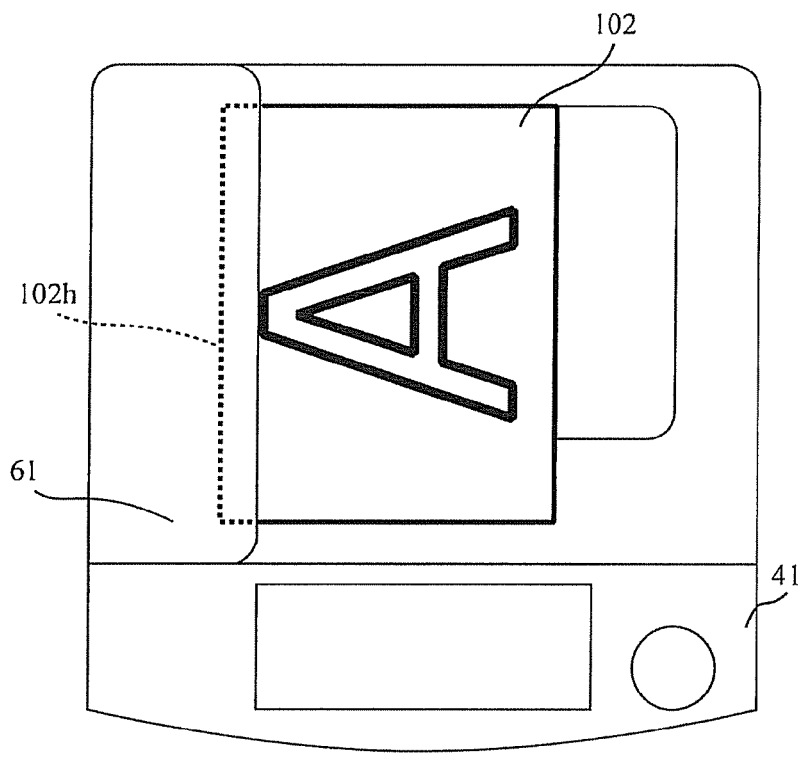

For example, to set the upper edge 101h of the portrait-oriented document 101 as illustrated in FIG. 3A, or the upper edge 102h of the landscape-oriented document 102 as illustrated in FIG. 3B oriented leftward along the apparatus at the ADF 61, the user operates the operation panel 41 to set the document setting direction as "left."

Thus, with this set information that side of the document image based on the generated image data is an upper edge is identified in the apparatus.

The image forming apparatus according to the embodiment allows copying in a continuous reading mode. The continuous reading mode continues reading of the document images until the user operates termination of reading. Upon termination of reading by the user operation, the continuous reading mode outputs a copy of the document images read up to the moment. In the continuous reading mode, the operation panel 41 accepts a user operation for terminating reading after start of reading the document images.

For example, in the continuous reading mode, after documents set at the ADF 61 are all read, the user can change various user settings, set the subsequent documents at the ADF 61, cause the subsequent documents to be read, and output a copy of documents read until the termination of the reading as a series of documents. Accordingly, in the continuous reading mode, the user can select one form image and combine the form image with various documents while the user setting is changed on the way.

The storage device 22 preliminary stores form image data 51 and form attribute data 52 that represents the direction of the upper edge of the form image based on the form image data. Form images include, for example, a ledger sheet image, a header, and a footer image.

Figure 4A:
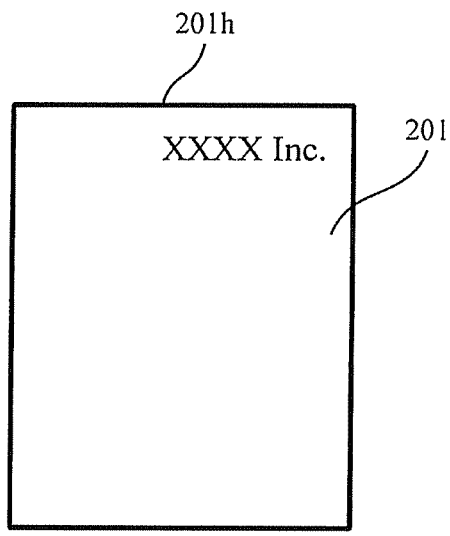
FIGS. 4A and 4B illustrate an exemplary form image based on form image data.
Figure 4B:
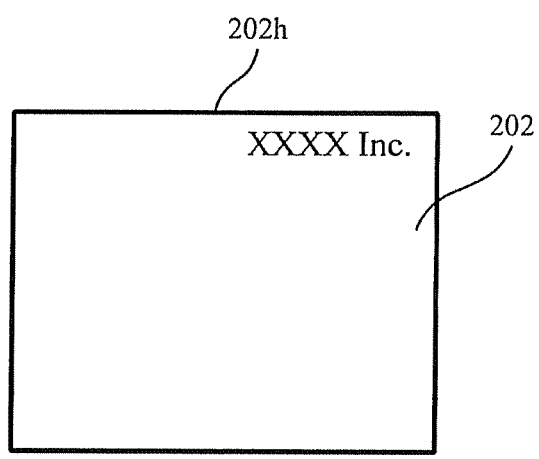

FIGS. 4A and 4B illustrate an exemplary form image based on the form image data 51. A form image 201 illustrated in FIG. 4A is a portrait-oriented (vertically long) form image whose head line is an upper edge 201h. A form image 202 illustrated in FIG. 4B is a landscape-oriented (horizontally long) form image whose head line is an upper edge 202h.

In the case where the head line is fixed as the upper line, the form attribute data 52 is not required.

In the embodiment, the form image data 51 or similar data are preliminarily stored in the storage device 22. However, before or after the document image is read, an image of a paper sheet where a form image has been recorded by a print or similar job may be read, the image data generated by the image reading may be employed as form image data. Then, the upper edge of the form image may be identified by user setting similarly to the document image.

The output image processing circuit 23 functions as an image rotation processor, (a) obtains the form image data 51, (b) identifies the direction of the upper edge of the document image on the first page of the document, and (c) rotates the form image such that the direction of the upper edge of the document image on the first page to match the direction of the upper edge of the form image if the direction of the upper edge of the document image on the first page differs from the direction of the upper edge of the form image based on the form image data 51. The output image processing circuit 23 (d) rotates the document image on each page subsequent to the second page such that the direction of the upper edge of the document image on the first page matches the direction of the upper edge of the document image on each page subsequent to the second page if the direction of the upper edge of the document image on each page subsequent to the second page differs from the direction of the upper edge of the document image on the first page.

As described above, the output image processing circuit 23 identifies the direction of the upper edge of the document image from the user setting accepted by the operation panel 41.

Furthermore, the output image processing circuit 23 functions as an image combination unit that combines the form image processed by the image rotation processor and the document image on each page.

In the continuous reading mode, the output image processing circuit 23 combines the form image with each of a plurality of document images read by the image input unit 11 until termination of the reading. Then, if the operation panel 41 accepts a user setting on the direction of the upper edge of the document image from the start of reading to the end of the reading, the output image processing circuit 23 updates the direction of the upper edge of the document image based on the latest user setting.

Next, operations of the image forming apparatus will be described.

Here, operations of the input image processing circuit 12 and the output image processing circuit 23 in the copy job will be described in addition to operations of the output image processing circuit 23 in combining the form image.

(1) Operations of Input Image Processing Circuit 12 and Output Image Processing Circuit 23 in Copy Job At a start of the copy job, the input image processing circuit 12 secures the input side buffer region at a specified size in the RAM 13. Then, the input image processing circuit 12 controls the image input unit 11 to execute image reading by one page sequentially from the first page of the document. The input image processing circuit 12 buffers the image data obtained from the image input unit 11 to the input side buffer region in the RAM 13. Subsequently, the input image processing circuit 12 reads the image data after the input side image process from the input side buffer region and sends the image data to the output image processing circuit 23 via the interface 31.

Meanwhile, at a start of the copy job, the output image processing circuit 23 secures the output side buffer region at the specified size in the RAM 24. Upon reception of the image data from the input image processing circuit 12, the output image processing circuit 23 once stores the image data in the output side buffer region. The output image processing circuit 23 reads the image data from the output side buffer region to perform the output side image process. Then, the output image processing circuit 23 outputs the image data after the output side image process to the image output unit 21 and/or the storage device 22.

Figure 5:
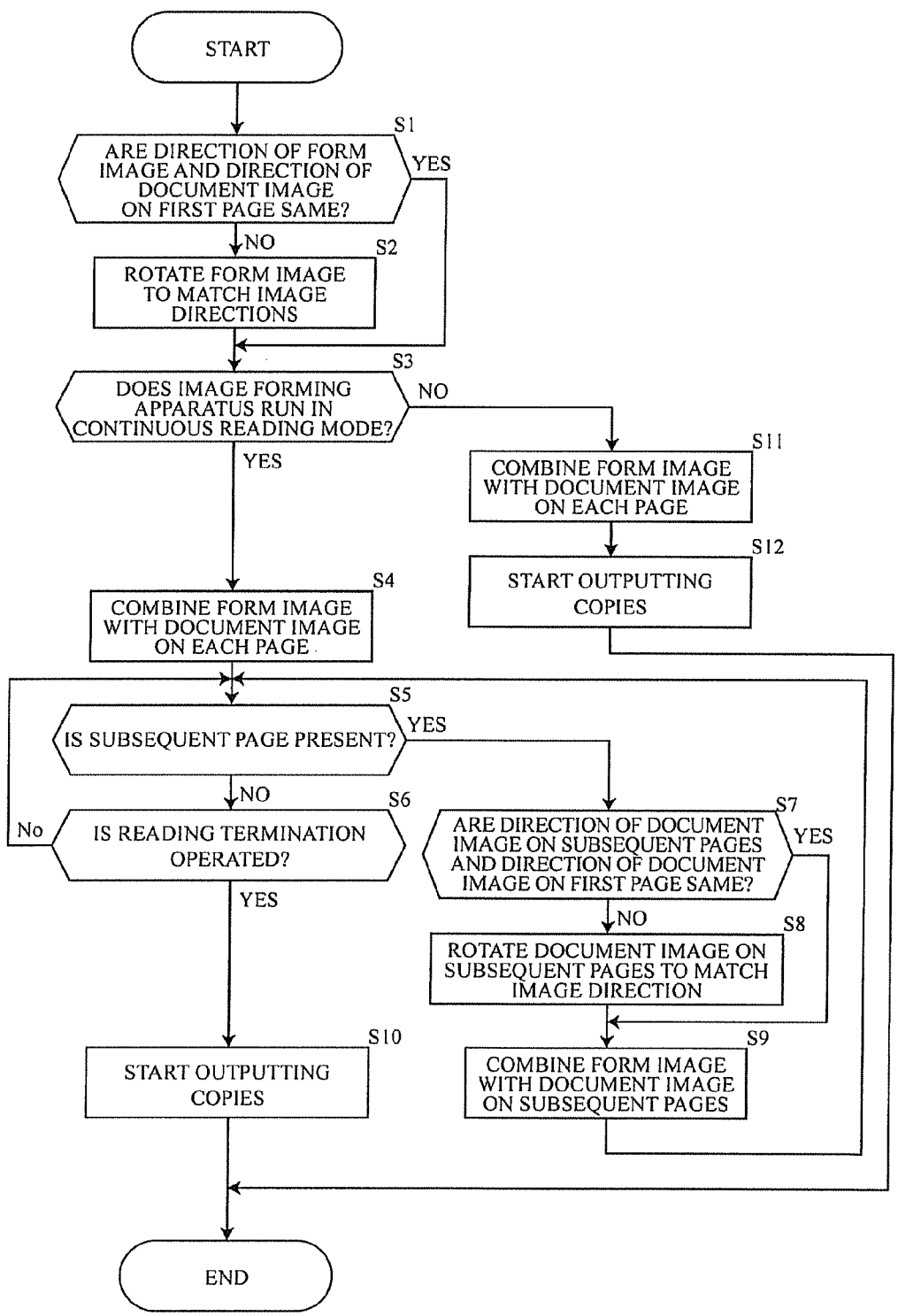
FIG. 5 illustrates an operation procedure of an output image processing circuit in FIG. 1 during combining the form image.

(2) Operation of Output Image Processing Circuit 23 During Form Image Combination FIG. 5 illustrates an operation procedure of the output image processing circuit 23 in FIG. 1 during combining the form image.

Here, the direction of the upper edge of the form image or the document image is simply referred to as a direction of the form image or the document image. This "direction" differs from "the direction" of the form image or the document image (portrait-oriented or landscape-oriented, namely, the longitudinal direction of the image).

The output image processing circuit 23 first identifies the direction of the form image and the direction of the document image on the first page and determines whether both are the same or not (Step S1). At this time, the output image processing circuit 23 retains data indicating the direction of the document image on the first page in the RAM 24. The data indicating the direction of the document image is used for comparison of the direction of the document image on the first page and the direction of the document images on the subsequent pages that will be described later.

If both are not the same, the output image processing circuit 23 rotates the form image such that the direction of the form image becomes the same as the direction of the document image on the first page (Step S2). At this time, the document image on the first page is not rotated regardless of the direction of the form image.

In use of the form image data 51 stored in the storage device 22, the output image processing circuit 23 reads the form image data 51 from the storage device 22, and stores the rotated form image data 51 into the RAM 24. Thereafter, the form image data 51 stored in the RAM 24 is employed until the termination of a series of processes.

If both are the same, the output image processing circuit 23 reads the form image data 51 from the storage device 22, and stores the form image data 51 into the RAM 24 without rotation. Thereafter, the form image data 51 stored in the RAM 24 (that is, the form image in the same direction as the document image on the first page) is employed until the termination of a series of processes.

Next, the output image processing circuit 23 selects a process according to whether the image forming apparatus runs the continuous reading mode or not (Step S3).

If the image forming apparatus runs in the continuous reading mode, the output image processing circuit 23 first combines the form image with the document image on the first page (Step S4).

The image data obtained by the combination is stored into the RAM 24. The second page or the subsequent pages are similarly processed.

Next, the output image processing circuit 23 monitors whether the image data of the document image on the subsequent page is present or not (Step S5) and whether the operation panel 41 has accepted an operation of reading termination or not (Step S6). If the image data of the document image on the subsequent page is not present, the output image processing circuit 23 stands by until the image data of the document image on the subsequent page is supplied or the operation of reading termination is accepted.

If the image data of the document image on the subsequent page is present, the output image processing circuit 23 determines whether the direction of the document images on the subsequent pages and the direction of the document image on the first page are the same or not (Step S7).

If, for example, the images of the document at the ADF 61 are all read and then the user setting on the direction of the subsequent pages is input to the operation panel 41 before the subsequent document is set to the ADF 61, the output image processing circuit 23 obtains information on the user setting from the control unit 25 and identifies the direction of the document image on the subsequent pages based on the information of the latest user setting.

If both are not the same, the output image processing circuit 23 rotates the document images on the subsequent pages such that the direction of the document images on the subsequent pages becomes the same as the direction of the document image on the first page (Step S8).

Then, the output image processing circuit 23 combines the form image with the document images on the subsequent pages using the form image data 51 in the RAM 24 (Step S9).

Thus, insofar as the image data on the subsequent page is present, processes of Steps S7 to S9 are performed page by page basis on the subsequent pages. In the processes of the subsequent pages, the form image and the document image on the first page are not rotated regardless of the direction of the document images on the subsequent pages.

Then, if the output image processing circuit 23 determines that the operation panel 41 accepts the operation of reading termination, the output image processing circuit 23 causes the image output unit 21 to output a copy based on the image data after the combination generated up to the moment (Step S10).

Meanwhile, if the image forming apparatus does not run in the continuous reading mode at Step S3, the output image processing circuit 23 combines the form image with the document images on each page using the form image data 51 in the RAM 24 (Step S11) and causes the image output unit 21 to output a copy based on the image data after the combination (Step S12).

As described above, according to the embodiments, the output image processing circuit 23 (a) obtains the form image data 51, (b) identifies the direction of the upper edge of a document image on the first page, (c) rotates the form image such that the direction of the upper edge of the document image on the first page matches the direction of the upper edge of the form image if a direction of the upper edge of the document image on the first page differs from the direction of the upper edge of the form image based on the form image data 51, and (d) rotates the document images on each page of the second page and the subsequent pages such that the direction of the upper edge of the document image on the first page matches the direction of the upper edges of the document images on each page of the second page and the subsequent pages if the direction of upper edges of document images on each page of the second page and the subsequent pages differs from the direction of the upper edge of the document image on the first page. Finally, the output image processing circuit 23 combines the processed form image with the document images on each page.

Thus, in combination of the form image with the document image, rotations of the form image are less frequent, thus achieving short process time.

Here, document images on the second page or the subsequent pages may be rotated. However, since the direction of the upper edges of the document images on the second page or the subsequent pages is often the same direction as the direction of the upper edge of the document image on the first page, thus the rotations of images are less frequent compared with one image forming method. The one image forming method compares a direction of a page image and a direction of a form image and rotates the form image as necessary. This consequently reduces the process time.

The above-described embodiments are examples of the disclosure. However, the disclosure is not limited to these embodiments, and various modifications and changes of the embodiments may be made without departing from the gist of the disclosure.

While in the above-described embodiment describes the image reading with the ADF 61, the same applies to the image reading in the flat bed mode.

While in the above-described embodiment the output image processing circuit 23 combines the form image, the control unit 25 may combine the form image instead. In this case, the control unit 25 functions as an image combination unit.

In the above-described embodiment, one of the document image and the form image may be slid as necessary to adjust the position when combining the form image.

The disclosure is applicable to an image forming apparatus such as a copying machine and a multi-functional peripheral.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. An image forming apparatus, comprising:
   an image rotation processor configured to:
   obtain form image data;
   identify a direction of an upper edge of a document image on a first page;
   rotate the form image such that the direction of the upper edge of the document image on the first page matches a direction of an upper edge of a form image if the direction of the upper edge of the document image on the first page differs from the direction of the upper edge of the form image based on the form image data; and
   rotate a document image on each page of the second page and the subsequent pages such that the direction of the upper edge of the document image on the first page matches a direction of an upper edges of the document image on each page of the second page and the subsequent pages if the direction of the upper edge of document image on each page of the second page and the subsequent pages differs from the direction of the upper edge of the document image on the first page; and
   an image combination unit configured to combine the form image processed by the image rotation processor with the document image on each page.

2. The image forming apparatus according to claim 1, further comprising;
   an image input unit configured to read the document image from a document, and
   a user operation unit configured to accept a user setting on a direction of an upper edge of the document image,
   wherein the image rotation processor is configured to identify the direction of the upper edge of the document image from the user setting accepted by the user operation unit.

3. The image forming apparatus according to claim 2,
   wherein the user operation unit is configured to accept a user operation to terminate reading after a start of reading of the document image,
   wherein the image rotation processor and the image combination unit are configured to process a plurality of the document images read by the image input unit until the termination of reading,
   wherein the image rotation processor is configured to update the direction of the upper edge of the document image based on the latest user setting if the user operation unit accepts the user setting on the direction of the upper edge of the document image from the start of reading to the termination of reading.

4. The image forming apparatus according to claim 1, further comprising
   an image output unit configured to output an image after being combined by the image combination unit.

5. An image forming method, comprising:
   obtaining, via an image rotation processor, form image data;
   identifying, via the image rotation processor, a direction of an upper edge of a document image on a first page;
   rotating, via the image rotation processor, the form image such that the direction of the upper edge of the document image on the first page matches a direction of an upper edge of a form image if the direction of the upper edge of the document image on the first page differs from the direction of the upper edge of the form image based on the form image data;

rotating, via the image rotation processor, a document image on each page of the second page and the subsequent pages such that the direction of the upper edge of the document image on the first page matches a direction of an upper edges of the document image on each page of the second page and the subsequent pages if the direction of the upper edge of document image on each page of the second page and the subsequent pages differs from the direction of the upper edge of the document image on the first page; and combining, via an image combination unit, the form image processed by the processing with the document image on each page.

6. The image forming method according to claim 5, further comprising;

reading, via an image input unit, the document image from a document; and accepting, via a user operation unit, a user setting on a direction of an upper edge of the document image, wherein the identifying includes identifying the direction of the upper edge of the document image from the user setting accepted by the accepting.

7. The image forming method according to claim 6, wherein the accepting accepts a user operation to terminate reading after a start of reading of the document image, wherein the processing and the combining process a plurality of the document images read by the reading until the termination of reading, wherein the processing updates the direction of the upper edge of the document image based on the latest user setting if the accepting accepts the user setting on the direction of the upper edge of the document image from the start of reading to the termination of reading.

8. The image forming method according to claim 5, further comprising outputting, via an image output unit, an image after being combined by the combining.

9. A non-transitory computer-readable recording medium storing an image forming program for causing a computer to function as:

an image rotation processor that:
    obtains form image data;
    identifies a direction of an upper edge of a document image on a first page;
    rotates the form image such that the direction of the upper edge of the document image on the first page matches a direction of an upper edge of a form image if the direction of the upper edge of the document image on the first page differs from the direction of the upper edge of the form image based on the form image data; and rotates a document image on each page of the second page and the subsequent pages such that the direction of the upper edge of the document image on the first page matches a direction of an upper edges of the document image on each page of the second page and the subsequent pages if the direction of the upper edge of document image on each page of the second page and the subsequent pages differs from the direction of the upper edge of the document image on the first page; and an image combination unit that combines the form image processed by the image rotation processor with the document image on each page.

10. The non-transitory computer-readable recording medium according to claim 9, the image forming program further causing the computer to function as:

an image input unit that reads the document image from a document, and a user operation unit that accepts a user setting on a direction of an upper edge of the document image, wherein the image rotation processor identifies the direction of the upper edge of the document image from the user setting accepted by the user operation unit.

11. The non-transitory computer-readable recording medium according to claim 10, wherein the user operation unit accepts a user operation to terminate reading after a start of reading of the document image, wherein the image rotation processor and the image combination unit process a plurality of the document images read by the image input unit until the termination of reading, wherein the image rotation processor updates the direction of the upper edge of the document image based on the latest user setting if the user operation unit accepts the user setting on the direction of the upper edge of the document image from the start of reading to the termination of reading.

12. The non-transitory computer-readable recording medium according to claim 9, the image forming program further causing the computer to function as an image output unit that outputs an image after being combined by the image combination unit.

\* \* \* \* \*